June 9, 1959 J. GIBBON 2,890,335
SIGNAL SLICING CIRCUITS
Filed Oct. 30, 1956

INVENTOR
JOHN GIBBON
BY Alfred B. Freeman
AGENT

United States Patent Office 2,890,335

Patented June 9, 1959

2,890,335

SIGNAL SLICING CIRCUITS

John Gibbon, Morris Plains, N.J., assignor to Monroe Calculating Machine Company, Orange, N.J., a corporation of Delaware Application October 30, 1956, Serial No. 619,295

8 Claims. (Cl. 250—27)

This invention relates to signal slicing circuits for improving signal to noise ratios.

The circuits of the instant invention effectively slice out the portions of the received signal which are between given positive and negative voltage levels while passing or amplifying the portions which are more positive or more negative. Where the desired signal is greater in amplitude than the noise, the amplitude range which is sliced can be set so that most of the noise will be removed.

The amplitude range which is sliced can be controlled in response to a voltage. Where the signal has a fixed amplitude level, the range which produces optimum results for the particular conditions can be set by a potentiometer adjustment. A voltage can also be derived from the signal itself, similarly to the way in which an automatic gain control voltage is derived, to control the slice and so maintain optimum effectiveness in cases where the signal strength varies.

Slicing or removing a portion of the signal will produce some distortion. Such distortion is unimportant, however, where the signal is digital in nature. In such cases, it is only necessary to distinguish between the presence or absence of a signal and the contrast is greatly increased by slicing out the part which includes most of the noise. The circuits of this invention are, therefore, particularly useful in digital computers and other digital data handling and processing equipments.

An object of the invention is means for improving signal to noise ratios.

A further object of the invention is means for improving signal to noise ratios where the signal and noise vary in amplitude.

Other objects and advantages together with a fuller understanding of the invention may be had by referring to the following description and claims taken in conjunction with the accompanying drawings in which:

Fig. 1 is a schematic diagram of a circuit forming an embodiment of the invention.

Fig. 2*a* is a graphical representation of the input-output voltage relationships for the circuit in Fig. 1.

Fig. 2*b* is a graphical representation of representative input-output signal wave forms for the circuit in Fig. 1.

Figures 1, 2A, 2B, 3, 4, 5A, 5B, 6:
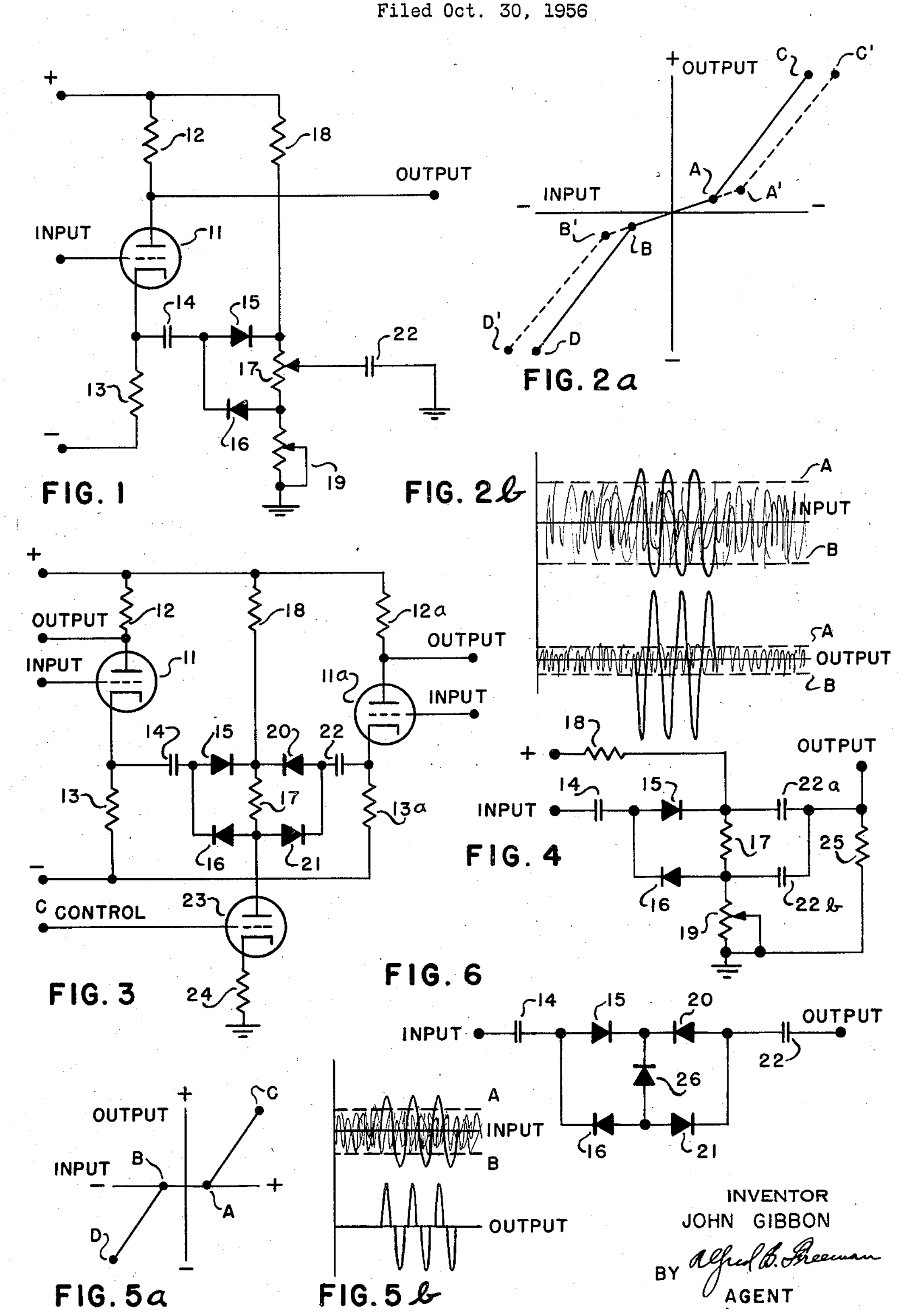
Fig. 3 is a schematic diagram of a circuit forming a second embodiment of the invention.
Fig. 4 is a schematic diagram of a circuit forming a third embodiment of the invention.

Fig. 5*a* is a graphical representation of input-output voltage relationships of the circuit of Fig. 4.

Fig. 5*b* is a graphical representation of possible input-output wave forms for the circuit of Fig. 4.

Fig. 6 is a schematic diagram of a fourth embodiment of the invention.

Referring now to Fig. 1, vacuum tube 11 has a plate load resistor 12 connected to the positive voltage supply and a cathode load resistor 13 connected to the negative voltage supply. The input signal is applied to the grid of tube 11 and the output is taken from its plate.

Condenser 14 is connected between the cathode of tube 11 and one terminal of rectifiers 15 and 16. The other terminals of rectifiers 15 and 16 are connected respectively to the upper and lower ends of resistor 17. Resistor 18 is connected between the upper end of resistor 17 and the positive voltage supply. Adjustable resistor 19 is connected between the lower end of resistor 17 and ground. Condenser 22 is connected between a center tap on resistor 17 and ground.

As in other circuits, the change in cathode voltage in response to a signal applied to the grid will always be less than the signal voltage. The change in plate voltage relative to the change in cathode voltage will be equal to the ratio of the plate impedance to the cathode impedance as substantially the same current flows in both. With a given plate load, the gain will be inversely proportional to the cathode impedance.

In the circuit of Fig. 1, the plate load impedance consists of resistor 12 and the cathode load impedance of resistor 13 in parallel with the network made up of condensers 14 and 22, resistor 17, and rectifiers 15 and 16. Resistors 18 and 19 are also part of the network but they have a relatively high impedance and so their effect in the network can be neglected. Resistor 13 will normally be made larger than resistor 12 so that the gain of the circuit will be less than one so long as the shunting effect of the network can be neglected. Values of resistors 12 and 13 which provide a gain greater than one with the network neglected can also be used but the gain should be kept fairly small.

As will be explained later, the network offers a high impedance to signal voltages appearing on the cathode of tube 11 until they go more positive or more negative than predetermined values. The gain of the circuit will thus be low, as determined by the relative sizes of resistors 12 and 13, while the signal is within a predetermined low amplitude range. When the signal goes beyond the predetermined values, either positively or negatively, the network offers a considerable lower impedance than resistor 12 and the circuit will have a high gain.

Condenser 14 applies the voltage variations appearing on the cathode of tube 11 to rectifiers 15 and 16. Rectifier 15 is biased by the potential on the upper end of resistor 17 and will offer a high impedance until the applied voltage goes more positive than its bias voltage. Rectifier 16 is connected oppositely in polarity to rectifier 15 and is biased by the potential on the lower end of resistor 17. Rectifier 16 will offer a high impedance until the applied voltage goes more negative than its bias voltage.

When rectifier 15 conducts, it will raise the voltage on resistor 17 and charge condenser 22 more positively. When rectifier 16 conducts, it will lower the voltage and discharge condenser 22. Resistors 18 and 19 will have a relatively high resistance so that most of the current through rectifiers 15 and 16 will charge or discharge condenser 22.

Condensers 14 and 22 will be comparatively large so that they will represent a low impedance to signal frequencies. The voltage across them will not change very much during any half cycle of signal voltage and the change will be reversed on the next half cycle. Condensers 14 and 22 each attain an average charge after a period of time so that the positive and negative signal voltages at which conduction starts through rectifiers 15 and 16, respectively, will be balanced with respect to the zero signal level. If the D.-C. voltage level on resistor 17 is changed by adjusting resistor 19, these positive and negative voltages will be unbalanced with respect to zero until condensers 14 and 22 each attain a new value of average charge to again bring them into balance.

As long as the signal voltage on the cathode remains within the range established by the voltage difference across resistor 17, rectifiers 15 and 16 will remain nonconducting. The network will then offer a high impedance to the signal and the cathode load impedance will be substantially equal to resistor 13. The gain of the circuit will then be less than one and the signal voltages within this amplitude range will be attenuated.

When the signal voltage on the cathode goes sufficiently positive, signal current will flow through condenser 14, rectifier 15, the upper half of resistor 17, and condenser 22. When it goes more negative, signal current will flow in the opposite direction through condenser 14, rectifier 16, the lower half of resistor 17 and condenser 22. In either case, the impedance of the network will be substantially equal to one half that of resistor 17. The cathode load impedance will then be substantially equal to that of resistor 13 in parallel with one half of resistor 17.

Resistor 17 will be made considerably smaller than resistor 12 so that the circuit will have a high gain when either half of it is effectively in parallel with resistor 13. The portions of the signal voltages which are more positive or more negative than predetermined values will be amplified in the output. The circuit thus has a low gain factor for the low amplitude portions of the signal and a high gain factor for the higher amplitude portions. The gain change could be made greater by shunting both halves of resistor 17 with condensers so that the impedance to signals would be lower.

The amplitude range for which the gain is low is determined by the steady state potential difference across resistor 17. This potential difference depends on the positive voltage supply and the size of resistor 17 relative to resistors 18 and 19. The potential difference, and so the low gain amplitude range, can be adjusted by varying the size of resistors 18 or 19 or both. Resistor 19 is shown as a potentiometer to be used in making the adjustment.

Adjusting resistor 19 will change the level of potential on each end of resistor 17 as well as the voltage across it. Because of the charge on condensers 14 and 22, this change of level will shift the positive and negative gain change points with respect to the zero signal value. As the signal goes positive and negative, condensers 14 and 22 will charge and discharge unequally until the average value of charge changes sufficiently to again center the change points with respect to the zero value.

This momentary shift of the gain change points could be avoided by adjusting both resistor 18 and resistor 19 so that the change of level on both ends of resistor 17 is balanced with respect to the average potential on condensers 14 and 22. If resistor 19 were connected to the negative supply instead of to ground, the average potential on condensers 14 and 22 could be made equal to ground potential. Condenser 22 could then be eliminated and the center tap on resistor 17 connected directly to ground.

Fig. 2*a* shows a curve of the input-output voltage relationships for the circuit of Fig. 1. The input signal voltage is plotted along the horizontal axis and the output signal voltage along the vertical axis. Points A and B on the curve are the points at which the gain changes. The gain is low between these points as shown by the slope of the curve between A and B and is high beyond these points as shown by the slope between points A and C and between points B and D.

Adjusting resistor 19 to increase the voltage across resistor 17 will shift points A and B out from the center to points A′ and B′ on the curve shown by the dotted lines. The slope between points A′ and B′ on the new curve is the same as between points A and B. The slope between points A′ and C′ and between points B′ and D′ on the new curve is the same as that between points A and C and between points B and D. Decreasing the voltage across resistor 17 would shift points A and B in toward the center.

Fig. 2*b* shows a possible input voltage waveform and the output waveform which would result from the circuit of Fig. 1. Dotted lines A and B show the amplitude levels corresponding to points A and B on the curve of Fig. 2*a*. The portions of the input waveform between lines A and B appear in the output with a considerable reduction in amplitude. The portions of the input above line A and below line B are increased in amplitude in the output. As most of the noise components are between lines A and B, they are reduced while the signal components outside are increased so that a considerable improvement in the desired signal to noise ratio results.

Fig. 3 shows a modification to the circuit of Fig. 1. This modification provides a circuit which has an input-output voltage relationship like the circuit of Fig. 1 but which changes the low gain amplitude range in response to an independent control voltage. In this circuit, the positive and negative gain change points are not shifted momentarily with respect to zero when the low gain amplitude range is changed. This makes it practical to control the low gain range dynamically in response to a control voltage proportional to the signal level and so obtain optimum results with varying signal strengths and conditions.

Tube 23 with cathode resistor 24 replaces adjustable resistor 19. The plate of tube 23 is connected to the lower end of resistor 17 and resistor 24 is connected between the cathode of tube 23 and ground. A control voltage input is applied to the grid of tube 23. The voltage on the grid determines the current which will flow through the tube and so controls the steady state voltage drop across resistor 17.

Tube **11*a* is added with plate load resistor 12*a* and cathode load resistor 13*a* and is connected across the positive and negative supplies in the same manner as tube 11 and resistors 12 and 13 in the circuit of Fig. 1. Rectifiers 20 and 21 are added and connected between one terminal of condenser 22 and the upper and lower ends respectively of resistor 17. Condenser 22 has its other terminal connected to the cathode of tube 11*a*. The input is applied to the grids of tubes 11 and 11*a* in opposite polarities and the output is taken differentially from their plates. Resistors 12*a* and 13*a* are of the same size as resistors 12 and 13**, respectively.

The voltages on the cathodes of tubes 11 and **11*a* swing in opposite directions in response to the opposite polarity signals applied to their grids. With the cathodes of tubes 11 and 11*a* going positive and negative respectively, a point will be reached when rectifiers 15 and 21 will start to conduct. The cathodes are then effectively coupled together through condensers 14 and 22, rectifiers 15 and 21, and resistor 17. When the cathodes of tubes 11 and 11*a* go negative and positive respectively, rectifiers 16 and 20 will conduct. The cathodes are then coupled through condensers 14 and 22, rectifiers 16 and 20, and resistor 17. It will be noted that signal current flow through resistor 17** is in the same direction in both cases.

As in the circuit of Fig. 1, condensers 14 and 22 offer a low impedance to signal frequencies and resistor 17 has a low value. Resistor 17 could be bypassed by a condenser to offer a yet lower impedance to signal frequencies. When rectifiers 15 and 21 or 16 and 20 conduct, tubes 11 and **11*a* both effectively have a low cathode load impedance and so a high gain. When rectifiers 15, 16, 20, and 21** are not conducting, the effective cathode impedance for both is high and their gain is low.

The points at which the gain changes are symmetrical with respect to the zero signal level and are determined by the D.-C. voltage drop across resistor 17. This D.-C. voltage drop and the voltage level on both ends of resistor 17 are controlled by the voltage on the grid of tube 23. For steady state conditions, tubes 11 and **11*a*** function similarly to tube 11 in the circuit of Fig. 1 and the input-output relations are like those shown in Fig. 2*a* and Fig. 2*b*. The response to rapid changes of voltage level on resistor 17 are different, however.

A decrease of D.-C. level on resistor 17 due to an increase of voltage on the grid of tube 23 will cause rectifier 15 to conduct before rectifier 21 as the signal on the cathode of tube 11 goes positive. Resistor 18 and tube 23 with resistors 17 and 24 will then effectively be in parallel with resistor 13 and the gain of tube 11 will change. This change will be slight, however, as the impedance offered by resistor 18 and tube 23 will be made comparable or larger than that of resistor 13.

With rectifier 15 conducting, the voltage on the upper end of resistor 17 will substantially follow further positive increases in signal on the cathode of tube 11. Resistor 24 in the cathode circuit of tube 23 makes tube 23 essentially a constant current element and the drop across resistor 17 does not appreciably change. As soon as the signal voltage difference between the cathodes of tubes 11 and 11*a* are greater than the drop, rectifier 21 starts to conduct and a large change of gain results.

Rectifiers 20 and 16 will conduct in the same way on the next half cycle of signal voltage as did rectifiers 15 and 21. When the D.-C. voltage level on resistor 17 is increased by decreasing the voltage on the grid of tube 23, rectifiers 16 and 21 will conduct before rectifiers 15 and 20 respectively. The gain change points will thus instantaneously follow the control voltage on the grid of tube 23 and will remain symmetrical with respect to zero signal level even though the control voltage changes rapidly. A slight increase in gain in the sliced region will result, when rapid changes are made, until the charge on condensers 14 and 22 readjusts.

Fig. 4 shows a modification to the network of the circuit of Fig. 1 and a manner of use independent of a vacuum tube. Condenser 22 is replaced by condensers 22*a* and 22*b* connected in series across resistor 17. An input is applied to the terminal of condenser 14 previously connected to the cathode of tube 11 and an output is taken from a load resistor 25 connected between ground and the junction of condensers 22*a* and 22*b*. Output load resistor 25 is connected between the junction of condensers 22*a* and 22*b* and ground.

As in the circuit of Fig. 1, rectifiers 15 and 16 only conduct when the signal applied through condenser 14 goes respectively more positive or negative than predetermined levels dependent on the voltage across resistor 17. The resulting change of voltage produced by conduction of rectifiers 15 and 16 is passed by condensers 22*a* and 22*b* to the output. The signal is then effectively applied to resistor 25 through condenser 14 and, either rectifier 15 and condenser 22*a*, or rectifier 16 and condenser 22*b*. As in the previous circuits, these paths offer a high impedance to signals when rectifiers 15 and 16 are not conducting and a low impedance when they are conducting.

Figs. 5*a* and 5*b* show curves of the input-output relations for the circuit of Fig. 4 corresponding to the curves of Figs. 2*a* and 2*b* for the circuits of Fig. 1 and Fig. 3. The two sets of curves are substantially the same except that in Fig. 5*a* the slope of the curve between points A and B is substantially zero and the portion of the input signal within the low amplitude range is therefore, zero in the output as shown in Fig. 5*b*. This difference is due to the fact that only the signal passing through the network reaches the output in the circuit of Fig. 4 whereas the gains of the circuits of Fig. 1 and Fig. 3 are not reduced to zero when the respective networks are non-conducting.

Fig. 6 shows another network for passing portions of signals outside a fixed low amplitude range. Condensers 14 and 22 and rectifiers 15, 16, 20, and 21 are connected as in the circuit of Fig. 3 except that condensers 14 and 22 couple to input and output terminals respectively instead of to the cathodes of tubes 11 and 11*a*. A zener crystal rectifier 26 is connected between the junction of rectifiers 15 and 20 and the junction of rectifiers 16 and 21. This is the same relative position that resistor 17 had in the circuit of Fig. 3.

The zener rectifier 26 is a silicon junction diode which has a high impedance in the inverse direction until a given magnitude of inverse voltage is applied. It then offers a very low dynamic impedance for voltages greater in magnitude. The inverse voltage at which the impedance changes is of the order of a few volts for some types and different types change impedance at different inverse voltages. Characteristics and ratings for such diodes are published by manufacturers such as National Semiconductor Products, Inc., of Evanston, Illinois.

For positive signals, the conduction path between input and output is through condenser 14, rectifier 15, rectifier 26, rectifier 21, and condenser 22. For negative signals, it is through condenser 14, rectifier 16, rectifier 26, rectifier 20 and condenser 22. It will be noted that the conduction path through rectifier 26 is in the inverse direction in both cases. Rectifier 26 will block conduction until the voltage across it exceeds the inverse voltage rating at which the dynamic impedance becomes low. It will, therefore, pass only the portions of the input signals which are greater in magnitude than this inverse voltage.

The input-output voltage relations for this circuit will be the same as shown in Figs. 5*a* and 5*b* for the circuit of Fig. 4. The locations of the points A and B at which the slope of the input-output curve changes will be fixed for a given rectifier 26. Different fixed levels can be provided by selecting silicon junction diodes with different ratings to be used as rectifier 26. The level could be made adjustable by applying a variable forward or inverse bias to rectifier 26. The signal would then have to overcome, or would be aided by, the bias in applying the necessary inverse voltage to rectifier 26 to cause conduction.

The networks of Figs. 1 and 3 could also be used alone like the circuits of Figs. 4 and 6 and would have similar input-output voltage relations. All that would be necessary would be to connect their respective condensers 14 and 22 to input and output terminals. It is also possible to provide input-output curves having three or more different slopes at different input magnitudes. This can be done by adding similar networks in parallel and setting them to conduct at different amplitudes. As the first network started to conduct, the impedance would be changed to a value dependent on the magnitude of its resistor 17. When the next one started to conduct, the impedance would again change to a value dependent on the impedance offered by the two resistors 17 in parallel.

Although the invention has been described with a certain degree of particularity, it is understood that the present disclosure has been made only by way of example and that numerous changes in the details of construction and the combination and arrangements of parts may be resorted to without departing from the spirit and scope of the invention as hereinafter claimed.

What is claimed is:

1. A circuit comprising a pair of vacuum tubes each having cathode and anode electrodes and at least one grid electrode, a potential source having taps at different potentials, a first pair of impedances connected respectively between a tap on said potential source and the anode electrodes of said tubes, a second pair of impedances connected respectively between another tap on said potential source and the cathode electrodes of said tubes, a first pair of asymmetrically conducting devices having their positive polarity terminals connected respectively to the cathode electrodes of said tubes and their negative polarity terminals connected together, a second pair of asymmetrically conducting devices having their negative polarity terminals connected respectively to the cathode electrodes of said tubes and their positive polarity terminals connected together, and means for providing a conductive path between the negative polarity terminals of said asymmetrically conducting devices in said first pair and the positive polarity terminals of said asymmetrically conducting devices in said second pair to permit conduction between the cathode electrodes of said tubes when the voltage difference between them exceeds a given magnitude.

2. The combination according to claim 1 wherein said conductive path providing means comprises a voltage divider having its ends connected to taps on said source and having first and second points connected respectively to the negative polarity terminals of said asymmetrically conducting devices of said first pair and the positive polarity terminals of said asymmetrically conducting devices of said second pair.

3. The combination according to claim 2 including means for adjusting the potential difference between said first and second points on said voltage divider.

4. The combination according to claim 3 including first and second condensers connected respectively between the cathode electrodes of said tubes and the common terminals of said first and second pairs of asymmetrically conducting devices.

5. The combination according to claim 4 wherein a section of said voltage divider comprises a third vacuum tube having at least one grid electrode and said adjusting means comprises means for controlling the amount of current flowing through said third tube.

6. The combination according to claim 5 including means for applying a signal differentially to the grid electrodes of said pair of tubes and means for taking an output differentially from the plate electrodes of said pair of tubes.

7. The combination according to claim 1 wherein said conductive path providing means comprises a crystal rectifier of the type having a low dynamic impedance in the reverse direction for voltages above a given magnitude connected with its negative polarity terminal to the negative polarity terminals of said asymmetrically conducting devices in said first pair and with its positive polarity terminal to the positive polarty terminals of said asymmetrically conducting devices in said second pair.

8. A circuit comprising a vacuum tube having cathode and anode electrodes and at least one grid electrode, a potential source having taps at different potentials, a first impedance connected between said plate electrode and a tap on said potential source, a second impedance connected between said cathode electrode and another tap on said source, a voltage divider having its ends connected to different taps on said potential source, a condenser having one terminal connected to said cathode electrode, and first and second asymmetrically conducting devices respectively connected between first and second points on said voltage divider and the other terminal of said condenser, said asymmetrically conducting devices being oppositely poled, a second vacuum tube connected with its anode and cathode as a section of said voltage divider and means for controlling the conduction through said vacuum tube for adjusting the potential difference between said first and second points on said voltage divider.

References Cited in the file of this patent

UNITED STATES PATENTS

| | | |
|---|---|---|
| 2,203,689 | MacDonald | June 11, 1940 |
| 2,247,324 | Travis | June 24, 1941 |
| 2,406,978 | Wendt et al. | Sept. 3, 1946 |
| 2,512,637 | Frazier | Jan. 27, 1950 |
| 2,538,028 | Mozley | Jan. 16, 1951 |
| 2,583,345 | Schade | Jan. 22, 1952 |

FOREIGN PATENTS

| | | |
|---|---|---|
| 143,356 | Australia | Sept. 12, 1951 |